Nov. 9, 1965    J. B. GILL    3,216,295
INTERNAL PIPE CUTTER
Filed Aug. 5, 1963    3 Sheets-Sheet 1

INVENTOR.
JOHN B. GILL
BY Schapp & Hatch
ATTORNEYS

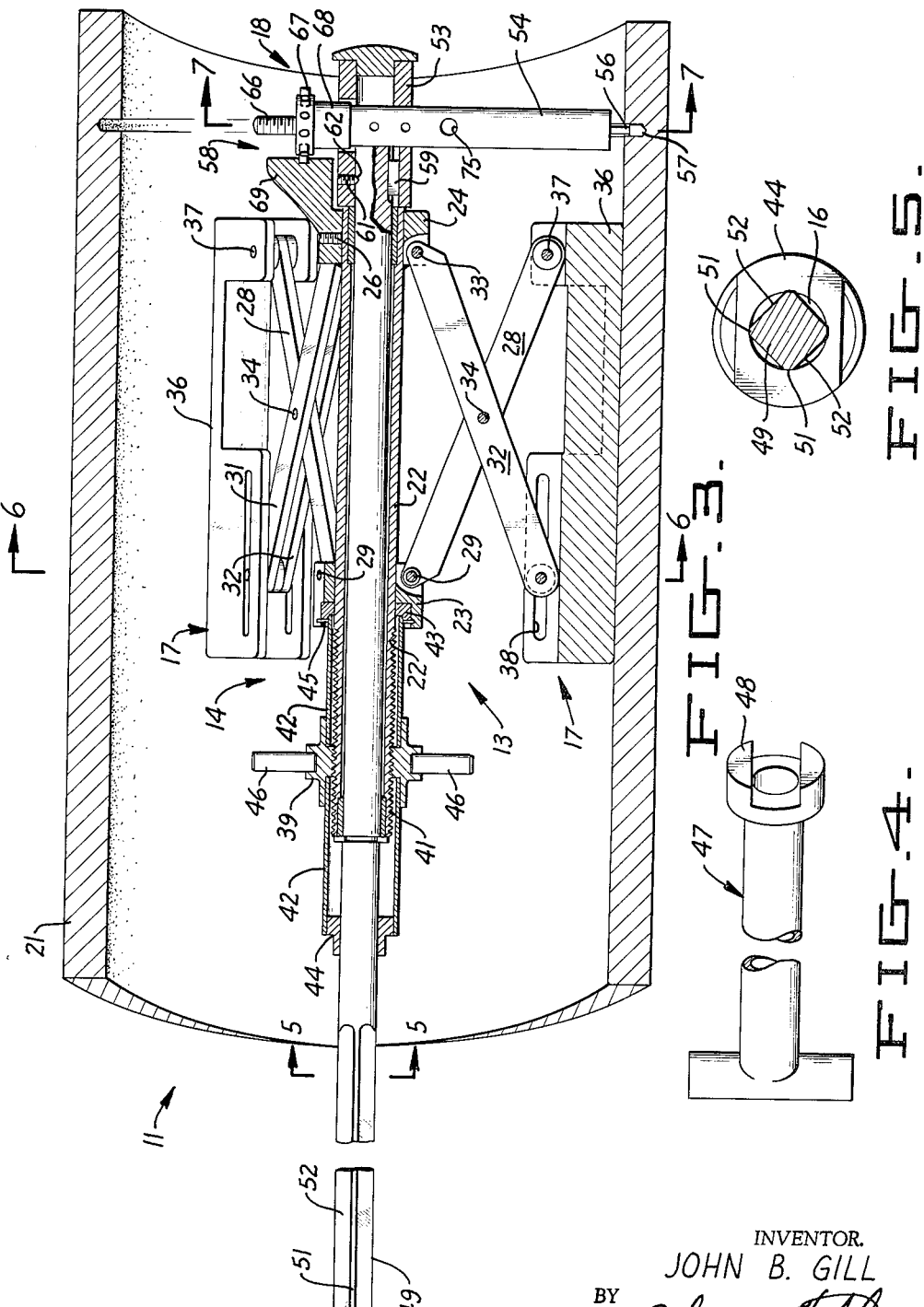

Nov. 9, 1965  J. B. GILL  3,216,295
INTERNAL PIPE CUTTER
Filed Aug. 5, 1963  3 Sheets-Sheet 3
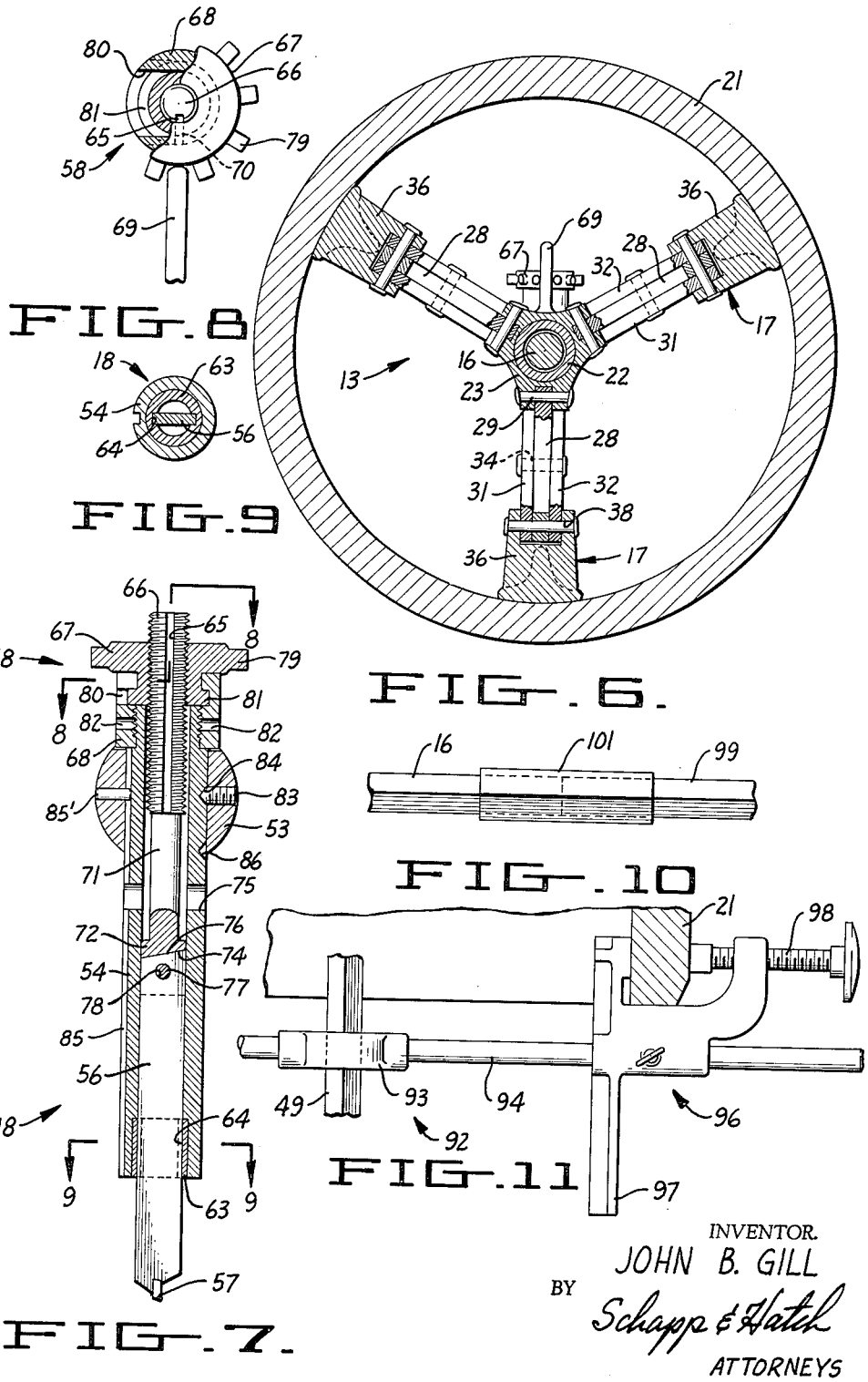
INVENTOR.
JOHN B. GILL
BY
Schapp & Hatch
ATTORNEYS

United States Patent Office 3,216,295
Patented Nov. 9, 1965

3,216,295
INTERNAL PIPE CUTTER
John B. Gill, 20433 Earl St., Torrance, Calif.
Filed Aug. 5, 1963, Ser. No. 300,029
15 Claims. (Cl. 82—82)

The present invention relates to improvements in an internal pipe cutter and more particularly to an internal pipe cutter suitable for cutting asbestos-cement pipe from an inner surface thereof.

Pipe cutting machines are well-known and various kinds of machines have been developed for the purpose. However, it has been customary to provide machines of this character which cut the pipe from the outside by means of a cutter which is advanced radially inward into the pipe surface and rotated therearound to provide a progressively deeper circular cut until the pipe has been completely severed. Although eminently satisfactory to achieve cutting, such machines have certain disadvantages such as the formation of a flange or other deformation on the inside of the pipe. In addition, where the pipe is of extremely large size and/or made of such materials as asbestos-cement, it is difficult to perform such cutting operation unless the cutter is to be made near an end of the pipe. Moreover, external pipe cutting has the disadvantage of causing spalling, particularly on lined pipes such as asbestos-cement pipe lined with epoxy resin.

It has been proposed to cut pipes from the inside, but such cutting operations have been rather difficult particularly on hard materials or large pipes, because it is necessary to provide considerable forces on the cutting tool and simultaneously support the tool accurately in position as the cut is made. Heretofore, internal cutting has been confined to relatively soft materials such as clay tile where the necessary cutting forces may be provided without special associated structure.

Recently, an internal pipe cutting machine has been invented by A. W. Leech and John B. Gill, the inventor of the present application and this invention is covered by a copending application Serial No. 297,913, filed July 26, 1963. This machine is capable of cutting pipe from the inside and is equipped with a rigid support so as to obtain a satisfactory cutting operation on relatively large asbestos-cement pipes. While this pipe cutter is eminently suitable for the purpose, it requires considerable supporting structure for the pipe being cut, and generally utilizes external support for the pipe tool operating to make the cut.

The present invention relates to improvements in the pipe cutting machine mentioned above, in which the cutting tool is supported within the pipe being cut in such a way that one end of the pipe completely supports the pipe cutter and opposes all of the torque and other forces provided during the cutting operation. In addition, the present invention provides additional advantages which make the tool more easily adapted to cut any pipe within a wide range of pipe sizes, and which is eminently suitable for cutting extra large diameter pipes.

Accordingly, it is a primary object of the present invention to provide a cutting tool which is rigidly supported and accurately located within a pipe for cutting the pipe from the inside thereof.

Another object of the invention is to provide a cutting tool of the character described capable of providing a clean, accurate cut on especially large asbestos-cement pipes including pipes lined with corrosive resistant materials.

A further object of the invention is to provide a cutting tool of the character described which is mounted for internally cutting pipe in such a way that good stability is provided during the operation of the cutter by utilizing a section of the pipe to hold all of the torque and other forces encountered during the cutting operation.

A still further object of the invention is to provide a pipe cutting tool of the character described which may be adjusted to accommodate the wide range of sizes of pipe and will support itself rigidly within the pipe in proper aligned position.

Still another object of the invention is to provide a cutting tool capable of cutting a pipe from the inside thereof which is self-cleaning and contains foolproof mechanisms for positively preventing improper cutting action from taking place within the pipe.

Yet another object of the invention is to provide a pipe cutting tool of the character described which is relatively simple in construction and easily supported for use on pipes under field conditions.

Further objects and advantages of my invention will be apparent as the specification progresses and the new and useful features of my internal pipe cutter will be fully defined in the claims attached hereto.

The preferred form of my invention is illustrated in the accompanying drawing forming a part of this description in which:

FIGURE 3 is a cross-sectional elevational view of a portion of the pipe cutter shown in FIGURE 2 taken substantially in the plane of line 3—3 thereof;

FIGURE 4 is an elevational view partly broken away, of a torque wrench suitable for use in tightening the pipe cutter of this invention in position on the pipe;

FIGURE 5 is a cross-sectional view taken substantially in the plane of line 5—5 of FIGURE 3;

FIGURE 6 is a cross-sectional view taken substantially in the plane of line 6—6 of FIGURE 3;

FIGURE 7 is a cross-sectional view taken substantially in the plane of line 7—7 of FIGURE 3 and illustrating in detail the transverse section of a cutting tool that may be used in the practice of this invention;

FIGURE 8 is an end view, partly in section of the cutting tool shown in FIGURE 7 and seen in the line 8—8 thereof;

FIGURE 9 is a cross-sectional view taken substantially in the plane of line 9—9 of FIGURE 7;

FIGURE 10 is a fragmentary elevational view illustrating the method of adding a coupling to the tool of the invention for enlarging the length thereof; and FIGURE 11 is a view, party in section, taken substantially in the plane of line 11—11 of FIGURE 2.

While I have shown only the preferred form of my invention, it should be understood that various changes or modifications may be made within the scope of the claims hereto attached without departing from the spirit of the invention.

Figure 1:
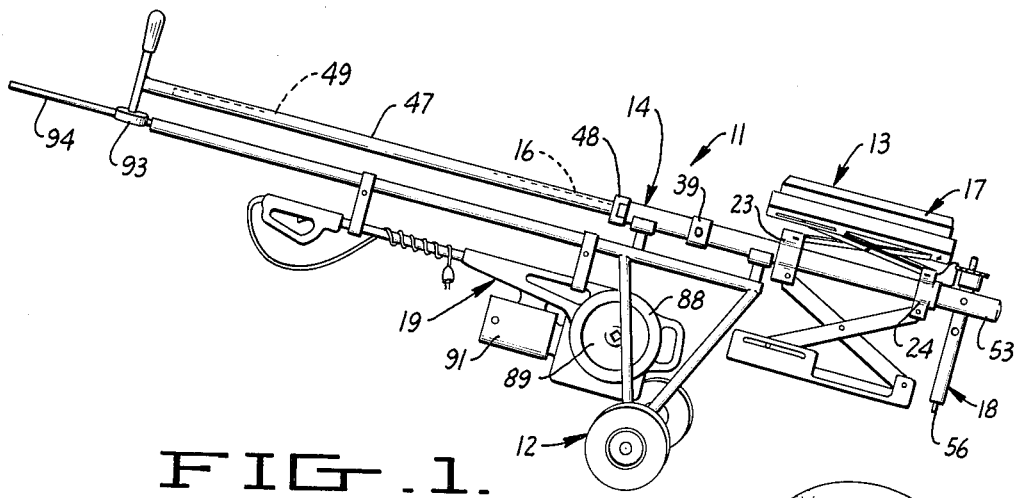
FIGURE 1 is a perspective view of a typical pipe cutter constructed according to the invention shown mounted on a dolly for easy transportation.

Referring to the drawing in greater detail, and particularly to FIGURE 1, there is shown a pipe cutter 11 mounted on a dolly 12 which is used to transport the pipe cutter from one job to another and to assist in positioning the cutter within a pipe. The pipe cutter here shown comprises an arbor assembly 13, containing a hub assembly 14 which carries a drive shaft 16 and has expandable gripping means 17 mounted thereon which means are capable of being forcibly extended radially against the inner surface of the pipe, a cutter head assembly 18 mounted on drive shaft 16 on one side of said gripping means and drive means in the form of power unit 19 constructed for driving the drive shaft on the other side of the gripping means.

It is important to have the cutter head assembly 18 and the drive means or power unit 19 placed on opposite sides of the holding mechanism so as to reduce gyration and balance the torque. As will be seen, the power unit 19 may be clamped to the same section of pipe as that in which the arbor is located so that the pipe itself will buck the torque and substantially no external forces are created during the cutting operation. In this way, external holding means are minimized or completely unnecessary.

Figure 2:
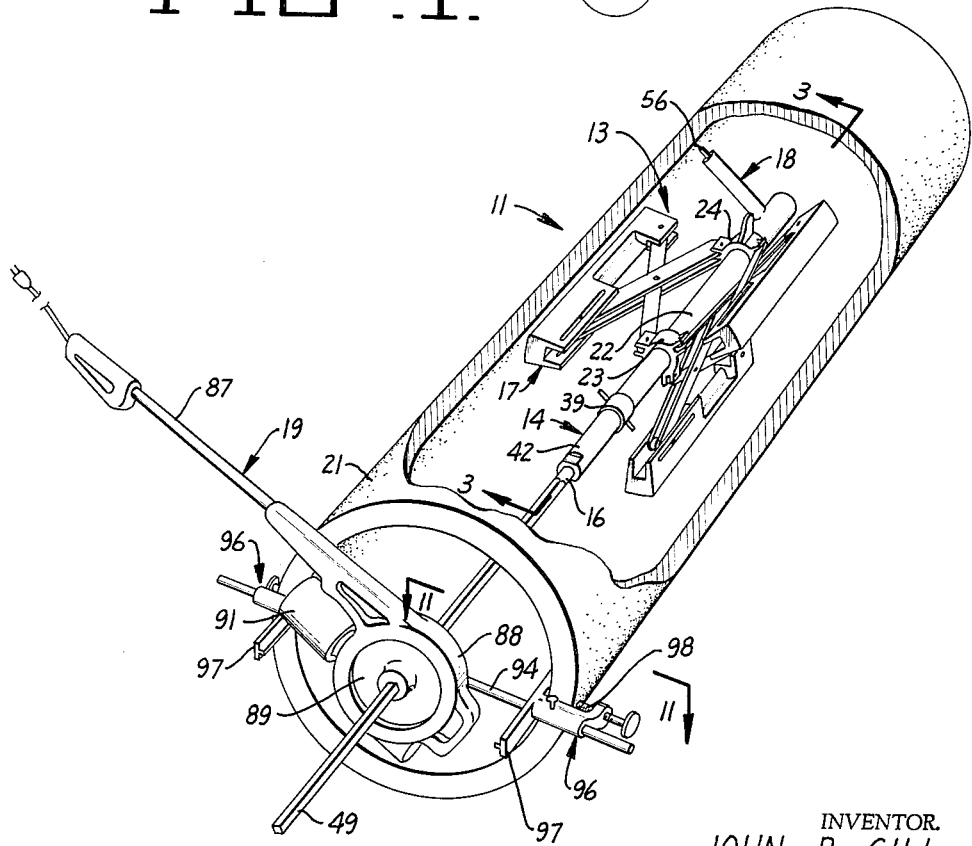
FIGURE 2 is a perspective view illustrating the pipe cutter of FIGURE 1 mounted in position in a pipe to be cut.

As illustrated in FIGURES 2, 3 and 6, the arbor 13 or holding means for holding the device tightly in position is adapted to engage the inner surface of pipe 21 with the expandable units 17 constructed to expand over a rather large range so as to accommodate various different sizes of pipes. In general, the holding means of the arbor may be any mechanism capable of providing a tight grip internally of the pipe, and a typical example of such a device is described in the United States Patent 2,607,376 of John T. Montgomery entitled Pipe Machining Tool.

Preferably, the extendable gripping means are similar to that herein illustrated which is described and claimed in the present inventor's copending application entitled Arbor Construction for Pipe Tools, Serial No. 324,765, filed November 19, 1963. In addition, and particularly where the cutter is to be utilized on extra large pipes, the gripping means that may be used is that described and claimed in another copending application of the present inventor entitled Arbor Construction for Mounting Pipe Tool, Serial No. 324,766, filed Nov. 19, 1963.

In the form here shown, as best seen in FIGURES 2 and 3, the hub assembly 14 of arbor 13 includes a tubular sleeve 22 having a bearing 23 mounted thereon for axial movement and a bearing 24 which is fastened to the tubular member 22 through 26 or any other suitable means. Thus bearing 24 is held against rotational and axial movement with respect to the shaft.

As here shown, the expandable holding means 17 contains three radial sets of grips spaced one hundred and twenty degrees apart, with the grips all being symmetrically constructed so that the tubular number 22 and drive shaft 16 which is journaled therein is maintained in exact central alignment within the pipe. This alignment is maintained very nearly perfect and the three sets of grips operate to provide an exceedingly tight grip even on pipes which are not exactly circular in cross section.

Each of these expandable holding or gripping means 17 comprises three sets of fingers with fingers 28 being pivotally mounted on bearing 23 at 29 and fingers 31 and 32 acting as a single unit pivoted at 33 on bearing 24, and the fingers being pivoted to each other at 34. With this construction, the fingers are expanded radially outward by movement of bearing 23 and bearing 24 relatively toward one another.

In the form here shown, the contact of the gripping means 17 against the pipe is obtained through channel bars 36 which contain surfaces adapted to abut the inner surface of the pipe and have a suitable attachment to the expandable fingers. One of the sets of fingers such as fingers 28 are pivoted at one end of the channel bar through pivot 37 and the other fingers 31 and 32 are adapted to slide in a slot 38 at the other end of the channel bar. This allows the ends of the fingers to move towards each other while maintaining the channel bars in an alignment substantially parallel to the axis of the pipe.

The channel bars provide an advantageous structure as is pointed out more fully in my copending application by extending the capacity of the arbor fingers, providing a skid for inserting the cutting tool into the machine, and increasing the area of pressure surface. The latter advantage is especially desirable where epoxy lined pipe is used, although it also has advantages in any pipe in preventing the ends of the fingers from digging into surface of the pipe and causing weaknesses or injury.

Any means for pushing the bearings 23 and 24 axially together with sufficient force to provide rigid clamping forces may be used. However, I prefer to utilize a nut 39 which is threaded on the tubular member 22 at an end thereof through threads 41 with the nut 39 held in a sleeve 42. This sleeve is adapted to abut bearing 23 through thrust ring 43 and is held in position by suitable connection to thrust ring 43 at one end and by bearing 44 at the other end thereof so that the sleeve will advance axially with respect to the tubular member 22 on rotation of the nut 39. Thrust ring 43 is also held to bearing 23 by a retaining ring 45 so that reverse axial movement is imparted to the bearing.

Sleeve 42 is here shown as constructed in two sections each of which are welded or otherwise secured to nut 39 so as to provide in integral unit. Nut 39 is also provided with grips 46 for quick manual adjustment which is used to expand the fingers so that the channel bars reach almost far enough to engage the pipe. Final gripping engagement is effected by rotation of the sleeve 42 through bearing 44 which is constructed to serve as a torque nut and receive a suitable torque wrench. In other words, bearing 44 is constructed to receive the head 48 of torque wrench 47, and the expandable gripping means are then tightened firmly into place by rotation of the torque wrench.

As best seen in FIGURES 3 and 5, a drive shaft 16 extends some distance from the arbor so that the arbor may be inserted well into the pipe and the drive shaft still driven from a position externally of the pipe. In order to provide gripping means for the external drive over a distance of the extension of the shaft, the driving extension thereof 49 is constructed with four flattened surfaces defining a square configuration in cross-section as best seen in FIGURE 5 with short arcs in cross-section therebetween for positioning the torque wrench as it is slipped over the shaft. In other words, curved surfaces 51 maintain the circular configuration of the shaft while flat surfaces 52 provide means for attaching a standard drive mechanism and transmitting power therefrom.

Drive shaft 16 is journaled through arbor 13 so that the driving extension 49 is located on the opposite side of the arbor from the cutter head assembly 18. This balances the torque internally of the pipe so that when the cutter is operating in the position shown in FIGURE 3, the torque forces are neutralized and gyration in minimal. In addition, the drive means is preferably clamped to the pipe so that the force of the cutting tool on the internal surface of the pipe is taken up in the pipe itself between the cutter and the drive means. In this way, an excellent balance of forces is achieved and very little forces externally of the pipe are provided. This makes it possible for the cutter to cut pipe as it lays on the ground.

The cutter head assembly 18 is constructed to fit onto the end of the pipe shaft 16 in a fashion which renders the cutting head assembly easily removable. In this way, various sizes of cutter head assemblies may be used to cut various sizes of pipes. Accordingly, the pipe cutter of this invention is generally provided with a plurality of different sizes of cutter head assemblies so as to be capable of cutting pipes ranging over a considerable size in a reliable cutting operation.

A typical cutter head assembly which is constructed according to this invention comprises a tubular member 53 having an end adapted to fit in tight telescoping relation over the end of drive shaft 16, a blade housing tube 54 attached to the tubular member 53 and perpendicular thereto so that the axis of blade housing tube 54 is perpendicular to the axis of drive shaft 16 when the cutter head assembly is attached to the end of the shaft, a cutter blade 56 mounted for axial movement within the blade housing tube and having an end extending therefrom containing a carbide cutter tip 57, and means 58 for moving the cutter blade axially within the blade housing tube.

As here shown, the cutter head assembly is keyed to drive shaft 16 by key 59 carried in a suitable key-way, and by a set screw 61 which is screwed into a suitable dimple 62 on the drive shaft 16. With this construction, the cutter head assembly may be removed simply by loosening the set screw and pulling the assembly axially off the tube. Conversely, the cutter head assembly is fit in place simply by slipping it over the end of the shaft and tightening the set screw 61 to hold it in place against axial movement. The forces of rotation between the drive shaft and the cutter head assembly are taken up by the key 59.

As best seen in FIGURES 7 and 9, the cutter blade 56 has a substantially rectangular shaped body portion which is of a size sufficient to match the internal diameter of the blade housing tube 54. This blade is held against rotation by means of a broached bushing 63 which is fit into the end of the tube and contains slot 64 on each side thereof for slidably holding the blade 56.

The means 58 for moving the blade axially within the blade tube housing 54 comprises a feed screw 66 threaded within a star wheel 67 which is held for rotation by a holding nut 68 and actuated by a striker 69 which is mounted on the arbor. In this way, the star wheel is rotated as the cutter head assembly is rotated within the pipe. Since the feed screw 66 is held against rotation by means of slot 65 and pin 70 held within the blade housing tube, rotation of this star wheel causes axial advancement of this feed screw through the threaded engagement therebetween.

As best seen in FIGURE 7, the feed screw 66 contains a shank portion 71 having a wiper 72 in the form of a circular element in matching configuration with the inside of the blade housing tube so as to wipe out dust and grit from the housing tube as the blade is advanced. Attachment of the feed screw to the cutter blade is obtained by constructing the end of the feed screw containing the wiper with a slot into which the blade fits with the slot having an inclined lower surface 74 in matching configuration to surface 76 of the cutter blade. The blade is held in place by a set screw 77 fitting into aligned openings 78 at the end of the feed screw and the cutter blade.

With this construction, the inclined surfaces prevent the cutter blade from being inserted in a reverse position on the feed screw and the slot in the feed screw orients the screw within the tube housing is also hold in the aligned position as explained hereinafter. This construction positively assures that the carbide cutter tip is cutting in the proper direction. This precaution is particularly important for the internal cutter of this invention because it is impossible or difficult to see how the cutter blade is actually doing the cutting while in operation. With this fool-proof system, any reverse rotation on the cutter blade would cause the blade to retract by reverse feeding action on the star wheel.

As indicated above, the feed screw is constructed to contain an element that serves as a wiper to help clean out the tube or force out any cutting dust that might fall into the tube. This is particularly important when cutting asbestos-cement pipe where large quantities of cement are cut into small particles and dirt. In order to assist in this removal and in cleaning of the unit, vents 75 are also provided in the walls of the blade housing tube 54.

Star wheel 67 contains a plurality of extensions or cogs 79 which are spaced around the wheel so that one cog will be contacted by striker 69 to rotate the star wheel an amount sufficient to move the cog to clear the striker, and a flange section 81 journaled within holding nut 68. Holding nut 68 is threaded onto the blade housing tube 54 and contains holes 82 for receiving a spanner wrench to provide a tight engagement thereon. In order to assemble the nut and star wheel, a cut away slot 80 is provided in the nut. After assembly, feed screw 66 prevents reverse movement through the slot.

In order to provide maximum support for the cutter blade as it is advanced into the pipe while making the cut, it is desirable to have the blade housing tube extend close to the pipe wall being cut. Accordingly, it is necessary that the blade housing tube be adjustable in order to provide more than one cutting position and accommodate more than one size of pipe.

As best seen in FIGURE 7, the blade housing tube fits axially into the tubular member 53 and is held therein by means of alignment slot 85 and pin 85' together with set screw 83 which is adapted to fit into either of dimples 84 or 86. Thus the construction shown provides positions for cutting two different sizes of pipes and in order to accommodate more pipe sizes, a series of cutter head assemblies are provided. Thus, with three cutter head assemblies, six sizes of pipe can be cut. It will be appreciated, that the cutter head assembly could be constructed to adjust to more than two positions and accommodate three or possibly four sizes of pipe instead of the two, if desired.

In operation, the pipe cutter 11 is wheeled to the proper location on dolly 12 and the expandable gripping means on the arbor or oriented in the shape of a Y with one of the group of three gripping means extending vertically downward. The proper size blade housing tube is applied and adjusted, and the arbor is set with the end thereof just inside of the end of the pipe. The expandable gripping means of the arbor are then expanded by hand rotation on the nut through hand grip 46 until the channel bars are just about to grip the pipe and yet with enough clearance to allow the arbor to be slid into the pipe. The cutter blade is also advanced by hand rotation of the star wheel until the cutter blade is also about to engage the inner pipe surface.

The entire unit is then slid axially into the pipe with the lower channel member serving as a skid. The proper positioning of the cutter blade is achieved by measuring the distance of the cutter blade from the far end of the pipe by using a carpenter's rule or another measuring means. In other words, the carpenter's rule or scale is inserted through the end of the pipe until it abuts the edge of the cutter blade and this gives the measurement of the pipe being cut off. With the unit thus set in place, wrench 47 is telescoped over the drive shaft into engagement onto the engageable portion of bearing 44 and wrench rotated until the expandable gripping means have been expanded tightly against the pipe to provide a strong clamping engagement therein.

With the pipe cutter thus set in place, the power unit 19 is applied to the drive shaft and the drive shaft rotated under power until the pipe has been off. This cutting is effected because rotation of the drive shaft causes corresponding rotation of the cutter head assembly which carries the cutter blade around on the inner surface of the pipe. Each time the cutter head assembly is rotated, the star wheel engages the striker bar and this causes radial movement of the cutter blade to bite deeper into the pipe and provide a deeper cut. In this way, the cutter blade is advanced incrementally for each revolution of the drive shaft.

After the pipe has been severed, the power means is shut off and the cutter blade is retracted by hand rotation of the star wheel in a reverse direction. The torque wrench 47 is then applied to reverse the bearing 44 and retract the expandable fingers in an amount sufficient to withdraw the pipe cutter from the pipe and back on to the dolly. The unit is then ready to cut another pipe.

In general, any suitable power means may be utilized to provide rotational movement to drive shaft 16, but I prefer to use one of the portable power units provided by Pilot Manufacturing Company of 20433 Earl Street, Torrance, California. These power drives include the electric power drive sold under Code #P68A which is the same as that illustrated in the drawing, or pneumatic power drive sold under the code name P68AR. Obviously other power units could be used such as a belt drive or other system from a power takeoff on any field unit or a hydraulic motor operating from a suitable power source.

The electric power drive herein shown comprises a lever arm 87 attached to a frame 88 in which in journaled a rotor 89 driven by electric motor 91 through suitable gears (not shown). The rotor 89 contains a central opening of square or rectangular configuration adjusted to match the square surface of drive shaft 16 so that the drive unit is simply threaded thereover by axial movement and tightened in place. As shown in the Pilot literature, the opening in this drive rotor is adjustable so that easy application on drive shafts of various sizes may be effected.

The lever arm 87 is particularly important because it is clamped to the pipe at the end thereof in the preferred operation to buck the torque and provide a balanced group of forces all acting through the pipe. In other words, the torque forces of the cutter internally of the pipe are opposed through structure connected back to the motor housing.

In general, any clamp may be used to clamp the lever 87 to the pipe which is capable of holding the lever against rotation. For example, the clamp illustrated in FIGURE 2 provides extensions which are adapted to hold the bar 87 tightly onto the end of the pipe section containing the unit.

The form illustrated in FIGURE 2 is utilized where the pipe cutter is inserted some distance within the pipe and it is desirable to center the drive shaft at the pipe and maintain the center at the drive end by additional support. In other words, the shaft is held against gyration by this extra support in addition to the holding provided by the arbor 13.

As best seen in FIGURES 10 and 11, a typical spider 92 comprises a hub 93, a cross bar 94, and a pair of clamps 96. The clamps 96 contain members 97 extending axially from the pipe and adapted to hold the lever 87 of the power drive thereon. In this way, any tendency for the pipe to rotate with respect to the power means is positively prevented. In other words, the rotational force caused by the cutting action of the cutter is balanced.

Clamps 96 may be any suitable clamp that is capable of holding the cross bar 94 to the pipe surface such as screw clamp 98 adapted to be pressed against the pipe. Hub 93 of the spider generally contains a bearing having a square opening conforming to the square opening of the drive shaft so as to hold the drive shaft in place centrally of the pipe and yet allow free rotation thereof.

In the event that it is desired to extend the pipe cutter even further into the pipe, it is contemplated that an extension may be added to the drive shaft 16. Such an extension is illustrated in FIGURE 10, where extension 99 is coupled to drive shaft 16 through a suitable coupling 101. It is desirable to utilize this extension instead of making the drive shaft inordinately long so that the cutter may not be unduly enlarged for ordinary operations and storage. As shown in FIGURE 1 the cutter, power unit, and also the extension and auxiliary cutters may all be mounted on the dolly for easy storage between operations.

From the foregoing description, it is seen that I have provided an improved pipe cutter capable of cutting large asbestos-cement pipe from the inside thereof without the need for lifting the pipe and holding it with external holding means such as a horse and chain tong. Thus the pipe may be cut in the field where it lays. In addition, it is seen that I have provided an apparatus of this character which is effective in operation, sturdy in construction, and capable of many years service under rugged field conditions.

I claim:

1. A pipe cutter for cutting a pipe from the inside thereof, comprising an arbor adapted to fit inside the pipe, expandable gripping means on said arbor, said gripping means including three sets of fingers with a channel bar associated with each set of fingers whereby the channel bars are each capable of being forcibly extended radially against the inner surface of the pipe, threaded means for actuating said gripping means and forceably extending said channel, bars radially against the inner surface of the pipe, said threaded means containing a surface adapted to receive a wrench for effecting rotation thereof to operate said gripping means, a sleeve member fitting over the threaded means to shield it from pipe cuttings, a drive shaft journaled for rotation through said arbor, a cutter head assembly mounted on one end of said drive shaft, a cutter blade mounted for axial movement in said cutter head assembly, means for moving the cutter blade on rotation of the drive shaft, and means on said shaft for mounting a drive mechanism with the arbor located between the cutter head assembly and the drive mechanism.

2. A pipe cutter for cutting a pipe from the inside thereof, comprising an arbor adapted to fit inside the pipe, expandable gripping means on said arbor, said gripping means including three sets of fingers with a channel bar associated with each set of fingers whereby the channel bars are each capable of being forcibly extended radially against the inner surface of the pipe, threaded means for forceably extending said gripping means radially against the inner surface of the pipe, said threaded means being formed for receipt of a wrench whereby the expandable gripping means may be clamped tightly in place within the pipe and under the arbor therein, a drive shaft journaled for rotation through said arbor, a cutter head assembly containing an elongated hollow housing having a cutter blade mounted for axial movement therein and attaching means for attaching the cutter head assembly to the end of the drive shaft with the axis of the cutter blade substantially perpendicular to the drive shaft, means mounted on the arbor which engages the cutter head assembly during rotation of the cutter head whereby the cutter blade is moved axially during said rotation, the direction of axial movement being determined by the direction of rotation of the cutter head, and means on said shaft for mounting a drive mechanism with the arbor located between the cutter head assembly and the drive mechanism.

3. The pipe cutter defined in claim 2, in which the attaching means for attaching the cutter head assembly includes a plurality of attaching positions for adjustment of the radial location of the cutter head assembly within the pipe.

4. The pipe cutter defined in claim 2 which also comprises a plurality of different sized cutter head assemblies with the attaching means therefor being constructed for removable attachment to the drive shaft whereby different sizes of cutter head assemblies may be utilized for different sizes of pipes.

5. A pipe cutter for cutting a pipe from the inside thereof, comprising an arbor adapted to fit inside the pipe, expandable gripping means on said arbor, threaded means for forceably extending said gripping means radially against the inner surface of the pipe, a drive shaft journaled for rotation through said arbor, a cutter head assembly containing an elongated hollow housing having a cutter blade mounted for axial movement therein and attaching means for attaching the cutter head assembly to the end of the drive shaft with the axis of the cutter blade substantially perpendicular to the drive shaft, said cutter head assembly also including a feed screw mounted for axial movement within the housing thereof and a threaded drive member rotatably mounted on the cutter head assembly and having its threads in operative engagement with the feed screw whereby rotational movement of the threaded drive member provides axial movement of the feed screw, said feed screw being attached to the cutter blade to provide axial movement thereof, said feed screw also being constructed with a wiper element in sliding engagement within the cutter head assembly housing to clean the pipe cuttings from the housing during the operation of the cutter, and means mounted on the arbor for rotating the threaded drive member on rotation of the cutter head assembly.

6. The pipe cutter defined in claim 5, in which the cutter blade is constructed to fit and be attached to the feed screw in only one position whereby correct positioning of the cutter blade is positively assured.

7. The pipe cutter defined in claim 5, in which the cutter head assembly housing has vents therein to allow easy removal of pipe cuttings.

8. A pipe cutter for cutting a pipe from the inside thereof, comprising an arbor adapted to fit inside the pipe, expandable gripping means on said arbor capable of being forcibly extended radially against the inner surface of the pipe, a drive shaft journaled for rotation through said arbor, a cutter head assembly mounted on one end of said drive shaft, a cutter blade mounted for axial movement in said cutter head assembly, means for moving the cutter blade on rotation of the drive shaft, drive means mounted on the drive shaft at a position on the side of the arbor opposite from the cutter head assembly, said drive means including a frame member rotatably supporting the drive shaft and having an arm adapted to extend across the open end of the pipe to be cut, and clamping means for clamping said arm to the pipe whereby the torque caused by the cutting blade is balanced within the pipe and pipe cutter.

9. A pipe cutter for cutting a pipe from the inside thereof, comprising an arbor adapted to fit inside the pipe, expandable gripping means on said arbor capable of being forcibly extended radially against the inner surface of the pipe, a drive shaft journaled for rotation through said arbor, a cutter head assembly mounted on one end of said drive shaft, a cutter blade mounted for axial movement in said cutter head assembly, means for moving the cutter blade on rotation of the drive shaft, a spider having bearing means for rotatably carrying the drive shaft at one end of the pipe and a plurality of radially extending arms adapted to abut the pipe end, and a clamp on each arm on the spider for holding the spider in operative position on the end of the pipe.

10. The pipe cutter defined in claim 9, in which the drive shaft contains a plurality of joined sections.

11. A pipe cutter for cutting a pipe from the inside thereof, comprising an arbor adapted to fit inside the pipe, expandable gripping means on said arbor capable of being forcibly extended radially against the inner surface of the pipe, a cutter head assembly containing an elongated hollow housing having a cutter blade mounted for axial movement therein and attaching means for attaching the cutter head assembly to the end of the drive shaft with the axis of the cutter blade substantially perpendicular to the drive shaft, said cutter head assembly also including a feed screw mounted for axial movement within the housing thereof and a threaded drive member rotatably mounted on the cutter head assembly and having its threads in operative engagement with the feed screw whereby rotational movement of the threaded drive member provides axial movement of the feed screw, said feed screw being attached to the cutter blade to provide axial movement thereof, and drive means mounted on the drive shaft at a position on the side of the arbor opposite from the cutter head assembly, said drive means including a frame member rotatably supporting the drive shaft and having an arm adapted to extend across the open end of the pipe to be cut, and clamping means for clamping said arm to the pipe whereby the torque caused by the cutting blade is balanced within the pipe and pipe cutter.

12. A pipe cutter for cutting a pipe from the inside thereof, comprising an arbor adapted to fit inside the pipe, expandable gripping means on said arbor capable of being forcibly extended radially against the inner surface of the pipe, a drive shaft journaled for rotation through said arbor, a cutter head assembly containing an elongated hollow housing having a cutter blade mounted for axial movement therein and attaching means for attaching the cutter head assembly to the end of the drive shaft with the axis of the cutter blade substantially perpendicular to the drive shaft, said cutter head assembly also including a feed screw mounted for axial movement within the housing thereof and a threaded drive member rotatably mounted on the cutter head assembly and having its threads in operative engagement with the feed screw whereby rotational movement of the threaded drive member provides axial movement of the feed screw, said feed screw being attached to the cutter blade to provide axial movement thereof, a spider having bearing means for rotatably carrying the drive shaft at one end of the pipe and a plurality of radially extending arms adapted to abut the pipe end, a clamp on each arm of the spider for holding the spider in operative position on the end of the pipe.

13. A pipe cutter for cutting a pipe from the inside thereof, comprising an arbor adapted to fit inside the pipe, expandable gripping means on said arbor, threaded means for forcibly extending said gripping means radially against the inner surface of the pipe, a sleeve member fitting over the threaded means to shield it from pipe cuttings, a drive shaft journaled for rotation through said arbor, a cutter head assembly mounted on one end of said drive shaft, a cutter blade mounted for axial movement in said cutter head assembly, means carried on the arbor for moving the cutter blade on rotation of the drive shaft, and means on said shaft for removably mounting a drive mechanism with the arbor located between the cutter head assembly and the drive mechanism.

14. A pipe cutter for cutting a pipe from the inside thereof, comprising an arbor adapted to fit inside the pipe, expandable gripping means on said arbor, threaded means for forcibly extending said gripping means radially against the inner surface of the pipe, a sleeve member fitting over the threaded means to shield it from pipe cuttings, a drive shaft journaled for rotation through said arbor, a cutter head assembly containing an elongated hollow housing having a cutter blade mounted for axial movement therein and attaching means for attaching the cutter head assembly to the end of the drive shaft with the axis of the cutter blade substantially perpendicular to the drive shaft, said cutter head assembly also including a feed screw mounted for axial movement within the housing thereof and a threaded drive member rotatably mounted on the cutter head assembly and having its threads in operative engagement with the feed screw whereby rotational movement of the threaded drive member provides axial movement of the feed screw, said feed screw being attached to the cutter blade to provide axial movement thereof, means mounted on the arbor for rotating the threaded drive member on rotation of the cutter head assembly, and drive means mounted on the drive shaft at a position on the side of the arbor opposite from the cutter head assembly, said drive means including a frame member rotatably supporting the drive shaft and having an arm adapted to extend across the open end of the pipe to be cut, and clamping means for clamping said arm to the pipe whereby the torque caused by the cutting blade is balanced within the pipe and pipe cutter.

15. A pipe cutter for cutting a pipe from the inside thereof, comprising an arbor adapted to fit inside the pipe, expandable gripping means on said arbor, threaded means for forcibly extending said gripping means radially against the inner surface of the pipe, a sleeve member fitting over the threaded means to shield it from pipe cuttings, a drive shaft journaled for rotation through said arbor, a cutter head assembly containing an elongated hollow housing having a cutter blade mounted for axial movement therein and attaching means for attaching the cutter head assembly to the end of the drive shaft with the axis of the cutter blade substantially perpendicular to the drive shaft, said cutter head assembly also including a feed screw mounted for axial movement within the housing thereof and a threaded drive member rotatably mounted on the cutter head assembly and having its threads in operative engagement with the feed screw whereby rotational movement of the threaded drive member provides axial movement of the feed screw, said feed screw being attached to the cutter blade to provide axial movement thereof, a spider having bearing means for rotatably carrying the drive shaft at one end of the pipe and a plurality of radially extending arms adapted to abut the pipe end, a clamp on each arm of the spider for holding the spider in operative position on the end of the pipe.

References Cited by the Examiner

UNITED STATES PATENTS

| 1,358,818 | 11/20 | Bering | 166—55.7 |
| 1,691,045 | 11/28 | Burke et al. | 82—4 |
| 2,638,667 | 5/53 | Anderson | 30—107 |

FOREIGN PATENTS 342,498  10/21  Germany.

WILLIAM W. DYER, Jr., *Primary Examiner.*

LEON PEAR, *Examiner.*